(12) United States Patent
Dorn et al.

(10) Patent No.: US 7,604,408 B2
(45) Date of Patent: Oct. 20, 2009

(54) LINEAR GUIDE DEVICE

(75) Inventors: Stefan Dorn, Arnstein (DE); Alfred Haub, Luelsfeld (DE)

(73) Assignee: Bosch Rexroth Mechatronics GmbH, Schweinfurt (DE)

( * ) Notice: Subject to any disclaimer, the term of this patent is extended or adjusted under 35 U.S.C. 154(b) by 415 days.

(21) Appl. No.: 11/560,023

(22) Filed: Nov. 15, 2006

(65) Prior Publication Data

US 2007/0258667 A1 Nov. 8, 2007

(30) Foreign Application Priority Data

Nov. 18, 2005 (DE) ................. 10 2005 055 101

(51) Int. Cl.
*F16C 29/06* (2006.01)

(52) U.S. Cl. .................................... 384/45

(58) Field of Classification Search ............. 384/13, 384/15, 43–45
See application file for complete search history.

(56) References Cited

U.S. PATENT DOCUMENTS

| 4,674,893 | A | * | 6/1987 | Teramachi | 384/45 |
|---|---|---|---|---|---|
| 5,727,884 | A | * | 3/1998 | Greiner et al. | 384/13 |
| 6,200,031 | B1 | * | 3/2001 | Faulhaber et al. | 384/45 |
| 6,203,199 | B1 | | 3/2001 | Pfeuffer | |
| 6,524,003 | B2 | * | 2/2003 | Michioka et al. | 384/13 |
| 6,558,039 | B2 | * | 5/2003 | Wu | 384/45 |
| 6,729,761 | B2 | * | 5/2004 | Matsui et al. | 384/45 |
| 6,957,916 | B2 | * | 10/2005 | Fujimura | 384/45 |
| 7,234,867 | B2 | * | 6/2007 | Ishihara | 384/45 |
| 7,306,373 | B2 | * | 12/2007 | Yamazaki et al. | 384/45 |
| 2002/0141667 | A1 | * | 10/2002 | Ishihara | 384/45 |
| 2005/0105834 | A1 | * | 5/2005 | Menges et al. | 384/44 |
| 2006/0023978 | A1 | * | 2/2006 | Haub | 384/13 |
| 2006/0104552 | A1 | * | 5/2006 | Kuwabara | 384/45 |

FOREIGN PATENT DOCUMENTS

| DE | 1 227 902 | 11/1966 |
|---|---|---|
| DE | 198 26 703 | 1/1999 |
| DE | 198 30 140 | 1/2000 |
| EP | 0 449 595 | 10/1991 |

* cited by examiner

*Primary Examiner*—Marcus Charles
(74) *Attorney, Agent, or Firm*—Michael J. Striker

(57) ABSTRACT

A linear guide device has a guide rail, a guide carriage having a rolling element recirculating channel, at least one endless row of rolling elements circulating in the rolling element recirculating channel and guiding the guide carriage on and along the rail, wherein the rolling element recirculating channel includes a load-bearing channel section and turnaround channel sections which connect the load-bearing channel section and a return channel section with each other, wherein the guide carriage includes substantially in a longitudinal region in the load-bearing channel section and the return channel section, a carriage body, end piece units provided on axially opposed ends of the carriage body, intermediate piece units located between the carriage body and the endpiece units, a groove element provided in the return channel section, which encloses rolling elements located in the return channel section around at least a portion of their circumference, and wherein the groove element is integrally formed in at least one of the intermediate-piece units.

7 Claims, 3 Drawing Sheets

LINEAR GUIDE DEVICE

CROSS-REFERENCE TO A RELATED APPLIACTION

The invention described and claimed hereinbelow is also described in German Patent Application DE 10 2005 055 101.7 filed on Nov. 18, 2005. This German Patent Application, whose subject matter is incorporated here by reference, provides the basis for a claim of priority of invention under 35 U.S.C. 119(a)-(d).

BACKGROUND OF THE INVENTION

The present invention relates to linear guide devices.

More particularly, the present invention relates to a linear guide device which includes a guide rail and a guide carriage, which, via at least one endless row of rolling elements circulating in a rolling element recirculating channel of the guide carriage, is guided on and along the guide rail; the rolling element recirculating channel includes turnaround channel sections which connect the load-bearing channel section and the return channel section with each other; the guide carriage includes a carriage body essentially in the longitudinal region of the load-bearing channel section and the return channel section, endpiece units on the axially opposed ends of the carriage body, and intermediate-piece units located between the carriage body and the endpiece units; a groove element is provided in return channel section, which encloses the rolling elements located in the return channel section around at least a portion of their circumference.

A linear guide device of this type is disclosed, e.g., in German unexamined patent application DE 198 30 140 A1. With this linear guide device, the groove elements are designed as lubricating shells, which are separate from the intermediate-piece units. Logistical and assembly-related effort is increased due to the separated configuration in particular.

SUMMARY OF THE INVENTION

The object of the present invention, therefore, is to provide a generic linear guide device which results in less logistical effort and simpler assembly.

This object is attained according to the present invention by a linear guide device of the type described initially, with which the groove element is integrally formed in at least one of the intermediate-piece units. This single-component design of intermediate-piece unit and groove element reduces the number of components used to form the linear guide device; stockpiling and assembly are simplified as a result.

Despite the single-component design, the intermediate-piece unit and the groove element could be manufactured out of different materials, which combine to form a single-component part during the manufacturing process, which is injection-moulding in particular. It was recognized, according to the present invention, however, that it is not necessary to design the groove elements as lubricating shells, but rather that good lubrication of the rolling elements can be ensured when the groove elements are manufactured—preferably via injection-moulding—out of a material which retains lubricant on the groove-element surface.

The manufacture of endpiece units with the groove element integrally formed therein can be simplified further by the fact that the groove element has a two-component design; one groove element is integrally formed in the intermediate-piece unit, and the other groove element is integrally formed in the other intermediate-piece unit. The particular advantage in terms of fabrication is the short length of the individual groove-element part. In this case, the two groove-element parts can be advantageously provided with interacting orientation members on their free ends, which engage in each other preferably in a groove-and-spring manner. This simplifies assembly, since the two groove-element parts orient themselves automatically relative to each other when the linear guide device is assembled.

It is basically possible for the two groove-element parts to have the same length, so that they both extend to the middle of the carriage body in the installed state of the linear guide device. Particularly when the guide carriage includes at least one rolling element recirculating channel on both sides of the guide rail, it is advantageous in terms of assembly, however, when the groove-element parts integrally formed in the same intermediate-piece unit have different lengths. In this case, the groove-element parts can be inserted one after the other into the return channel sections of the carriage body.

When the sum of the length of the groove-element part assigned to the return channel section of the one rolling element recirculating channel and the length of the groove-element part assigned to the return channel section of the other rolling element recirculating channel is equal to the length of one groove element, it is necessary to stockpile only one type of intermediate-piece unit, which can be located on both axially opposed ends of the carriage body.

The novel features of which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
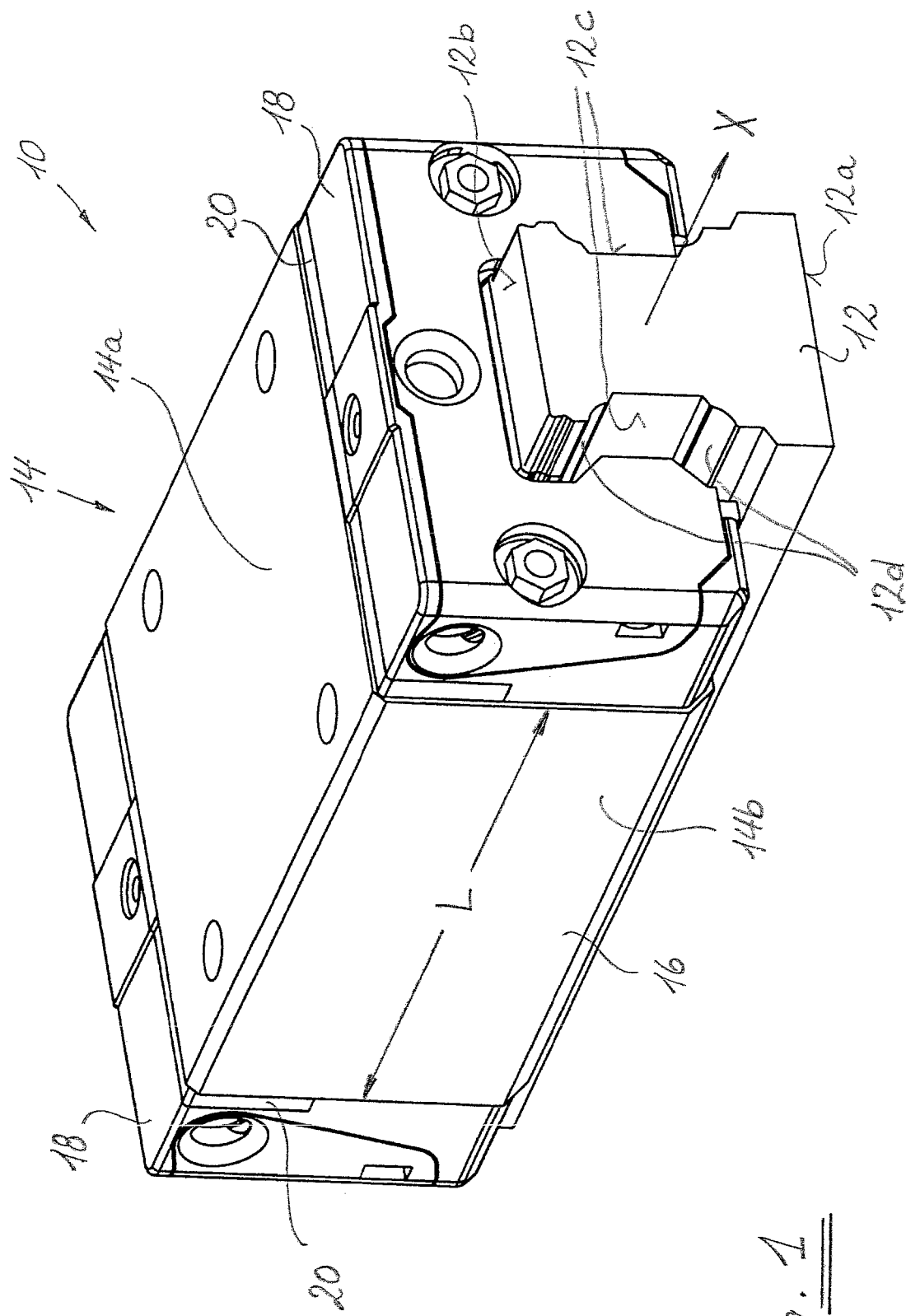
FIG. 1 shows a perspective illustration of an entire linear guide device in accordance with the present invention.

An inventive linear guide device is labelled in general with 10 in FIG. 1. Shown in particular is a guide carriage 14 guided on a guide rail 12 in the direction of a rail axis X, with a carriage body 16 and two endpiece units mounted on the two axially opposed ends of carriage body 16.

Guide rail 12 includes a fastening surface 12a, with which it can be secured to a (not shown) support, a top surface 12b which is diametrically opposed to fastening surface 12a, and two lateral surfaces 12c. Guide carriage 14 wraps around guide rail 12 essentially in a U-shaped manner; it includes a segment region 14a adjacent to top surface 12b and leg regions 14b which are joined together and are each adjacent to one of the lateral surfaces 12c.

Two endlessly recirculating rolling-element loops $S_1$ und $S_2$ (see FIG. 2; they are not shown in FIG. 1) are accommodated in a rolling-element recirculating channel K in each of the leg regions 16b. Load-bearing rolling-element rows $R_L$ of rolling-element loops $S_1$ and $S_2$ each roll on a track 12d of guide rail 12 formed in the associated lateral surface 12c. An axially continuous return bore (not shown) is provided in carriage body 16 for returning rolling-element rows $R_R$ of rolling-element loops $S_1$, $S_2$, while turnaround guides for turnaround rolling-element rows $R_U$ of each of the rolling-element loops $S_1$, $S_2$ are provided in endpiece units 18 and intermediate-piece units 20 located between carriage body 16 and endpiece units 18. In the exemplary embodiment shown, tracks 12d of guide rail 12 are formed for rows of bearings, although it is understood that any other types of rolling-elements can be used, e.g., rollers.

Figure 2:
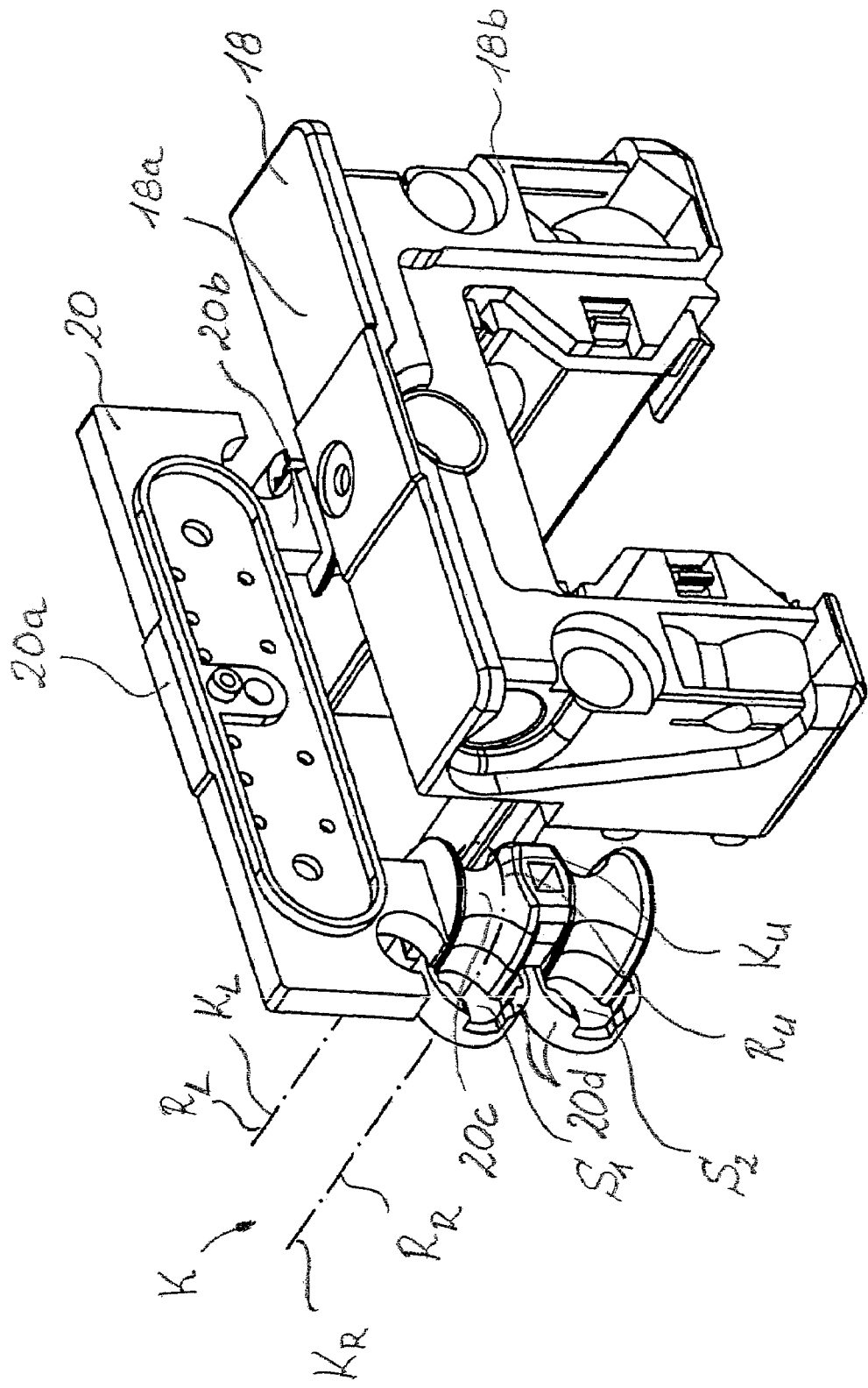
FIG. 2 shows a perspective illustration of an endpiece unit and a non-inventive intermediate-piece unit to also explain the basic design of the inventive linear guide device.

As shown in FIG. 2, endpiece unit 18 and intermediate-piece unit 20 are U-shaped in design, to match the U-shape of the guide carriage, with segment regions 18a, 20a and leg regions 18b, 20b. Essentially semi-toroidal, curve-inner turn-around surfaces 20c are shown on lateral leg 20b of intermediate-piece unit 20 at the left in FIG. 2, which, together with the complementarily shaped, curve-outer turnaround surfaces in corresponding lateral leg 18b of endpiece unit 18, form turnaround channel section $K_U$ for turnaround rolling-element rows $R_U$ of rolling-element loops $S_1$, $S_2$.

Annular elements 20d of intermediate-piece unit 20 allow access by the returning rolling elements of particular rolling-element loops $S_1$, $S_2$ to the (not-shown) return bores in carriage body 16, i.e., to return channel section $K_R$. No corresponding annular elements are provided in the region of the transition between turnaround channel section $K_U$ and load-bearing channel section $K_L$, since the load-bearing channel section is formed by tracks 12d of guide rail 12 and by complementary (not-shown) tracks provided on sides of guide carriage 14.

Figure 3A:
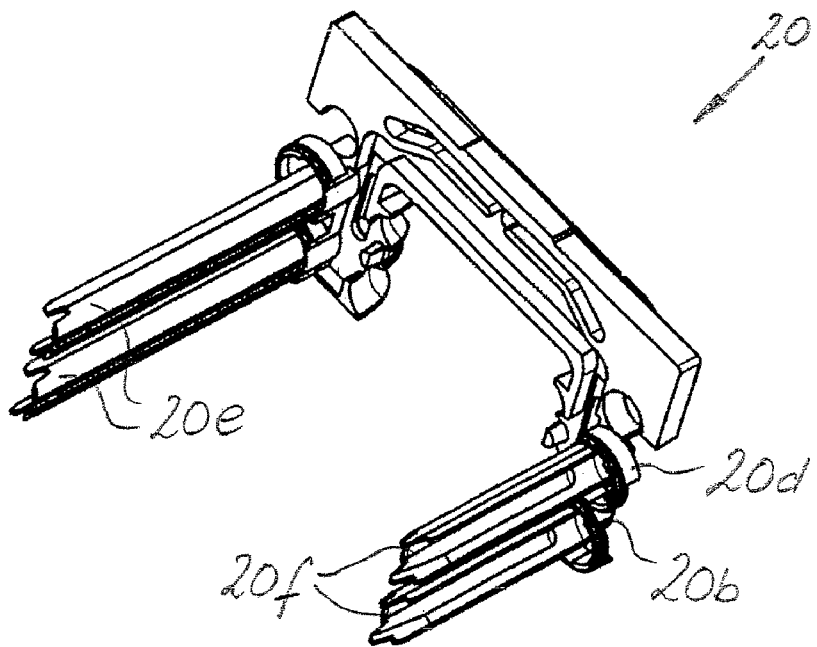
FIGS. 3a and 3b show a perspective view and a top view of an intermediate-piece unit in accordance with the present invention.
Figure 3B:
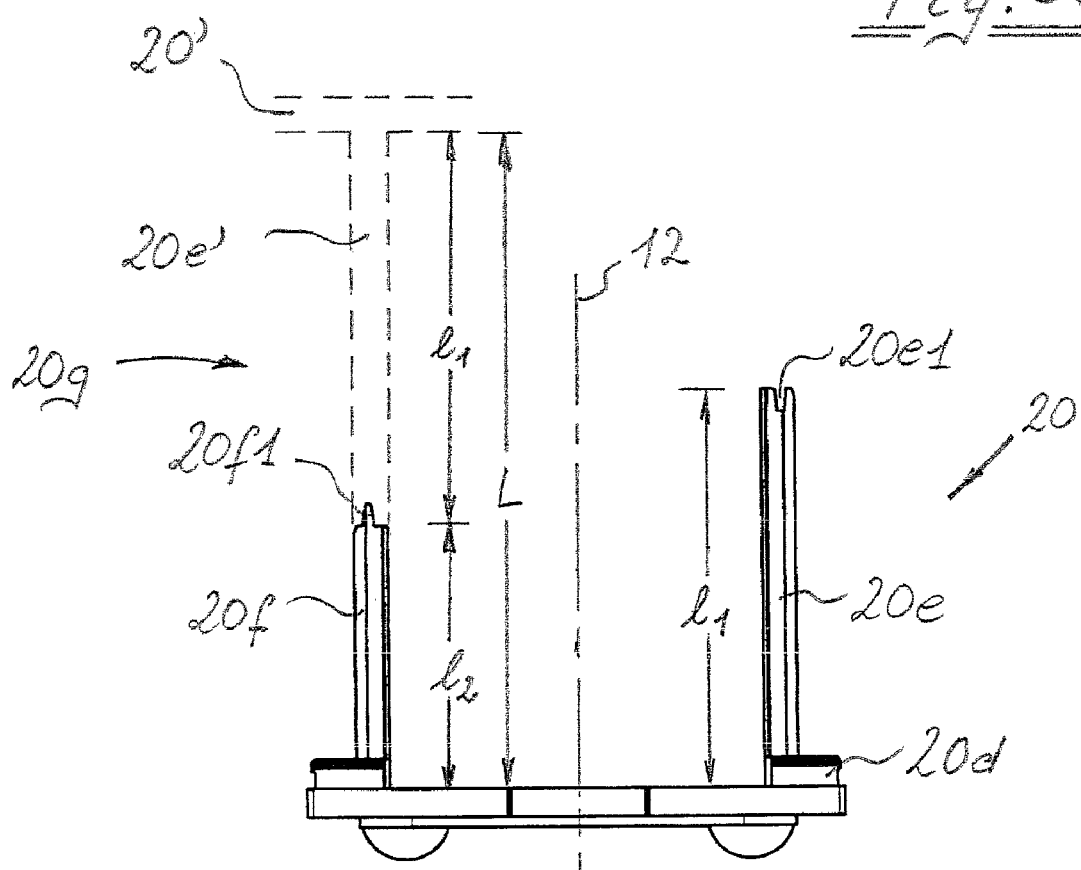

An inventive intermediate-piece unit 20 is shown in FIGS. 3a and 3b, which includes integrally-formed groove-element parts 20e, 20f. Groove-element parts 20e, 20f abut a circumferential section of annular elements 20d close to guide rail 12 and extend from lateral legs 20b of intermediate-piece unit 20 into carriage body 16, in particular into its return channel sections $K_R$. Groove-element parts 20e, 20f enclose the rolling elements around at least a portion of their circumference. They preferably enclose the rolling elements in a range of between 140° and approximately 220°, preferably approximately 180°.

As shown particularly well in FIG. 3b, groove elements parts 20e, 20f are formed with spring projections $20f_1$ and groove recesses $20e_1$ on their free ends, which, when an intermediate-piece unit 20 is inserted into return channel section $K_R$ from a longitudinal end of carriage body 16, and a further intermediate-piece unit 20' is inserted at the other end of carriage body 16 into this return channel section $K_R$, the free ends of groove elements 20e' and 20f which meet in return channel section $K_R$ orient themselves automatically relative to each other and form a common, continual groove element 20g.

It is also shown in FIG. 3b that groove-element part 20e has length $I_1$ and is therefore longer than groove-element part 20f, which only has length $I_2$. In both cases, associated annular element 20d has been added to the length of the groove-element part. Total length $I_1+I_2$ of groove element 20g corresponds to the length of return channel section $K_R$ and, therefore, to the length of carriage body 16 (see FIG. 1).

It should be added that groove-element parts 20e and 20f can be made of the same material as intermediate-piece unit 20, e.g., out of a material—preferably plastic—which retains lubricant on the groove-element surface. It should also be added that the free ends of groove-element parts 20e, 20f can be designed such that they taper outwardly, to ensure smooth circulation of rolling-element loops $S_1$, $S_2$ if tolerances arise.

Individual groove-element sections, which are not integrally connected with intermediate-piece unit 20, are inserted so that the same intermediate-piece units 20 can also be used for longer guide carriages 14.

It will be understood that each of the elements described above, or two or more together, may also find a useful application in other types of constructions differing from the type described above.

While the invention has been illustrated and described as embodied in a linear guide device, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

What is claimed as new desired to be protected by Letters Patent is set forth in the appended claims.

1. A linear guide device, comprising a guide rail; a guide carriage having a rolling element recirculating channel; at least one endless row of rolling elements circulating in said rolling element recirculating channel and guiding said guide carriage on and along said rail, said rolling element recirculating channel including a load-bearinn channel section and turnaround channel sections which connect said load-bearing channel section and a return channel section with each other, said guide carriage including substantially in a longitudinal region in said load-bearing channel section and said return channel section, a carriage body; end piece units provided on axially opposed ends of said carriage body; intermediate-piece units located between said carriage body and said end-piece units, a groove element provided in said return channel section, which encloses rolling elements located in said return channel section around at least a portion of their circumference, said groove element being integrally formed in at least one of said intermediate-piece units, wherein said groove element has two groove-element parts which are provided with interacting orientation members on their free ends and engage in each other, and wherein said guide carriage has at least one said rolling element recirculating channel on both sides of said guide rail, said groove-element parts being integrally formed in the same intermediate-piece unit and having different lengths.

2. A linear guide device as defined in claim 1, wherein said groove element has a two-component design with one groove element which is integrally formed with one of said intermediate piece units, and another groove element which is integrally formed in the other of said intermediate piece units.

3. A linear guide device as defined in claim 1, wherein said two groove-element parts engage in each other in a groove-and-projection manner.

4. A linear guide device as defined in claim 1, wherein said channels are formed so that a sum of a length of said return channel section of one of said groove-element parts assigned to said rolling element recirculating channel and a length of another groove-element part assigned to said return channel section of the other rolling element recirculating channel is equal to a length of one groove element.

5. A linear guide device as defined in claim 1, wherein said groove element is composed of a material which retains a lubricant on a surface of said groove element.

6. A linear guide device as defined in claim 5, wherein said groove element is configured as an injection-molded groove element.

7. A linear guide device as defined in claim 5, wherein said groove element is composed of plastic which retains a lubricant on the surface of said groove element.

* * * * *